(12) United States Patent
Zaklad et al.

(10) Patent No.: US 11,922,977 B2
(45) Date of Patent: Mar. 5, 2024

(54) METHOD OF REAL TIME MARKING OF A MEDIA RECORDING AND SYSTEM THEREFOR

(71) Applicant: BZ OWL LTD, Ramat Gan (IL)

(72) Inventors: Gil Zaklad, Ramat Gan (IL); Alexander Beliy, Netivot (IL)

(73) Assignee: BZ OWL LTD, Ramat Gan (IL)

( * ) Notice: Subject to any disclaimer, the term of this patent is extended or adjusted under 35 U.S.C. 154(b) by 0 days.

(21) Appl. No.: 17/751,479

(22) Filed: May 23, 2022

(65) Prior Publication Data
US 2022/0284929 A1    Sep. 8, 2022

Related U.S. Application Data

(63) Continuation-in-part of application No. PCT/IB2020/061599, filed on Dec. 7, 2020.

(60) Provisional application No. 62/944,061, filed on Dec. 5, 2019.

(51) Int. Cl.
   G11B 27/34    (2006.01)
   G11B 27/034    (2006.01)
   G11B 27/36    (2006.01)

(52) U.S. Cl.
   CPC ........... *G11B 27/34* (2013.01); *G11B 27/034* (2013.01); *G11B 27/36* (2013.01)

(58) Field of Classification Search
   CPC combination set(s) only.
   See application file for complete search history.

(56) References Cited

U.S. PATENT DOCUMENTS

2010/0287473 A1*  11/2010  Recesso .............. G09B 5/00
                                                        715/716
2015/0262617 A1*  9/2015  Jaime ................ H04N 5/77
                                                        386/241

* cited by examiner

*Primary Examiner* — Girumsew Wendmagegn
(74) *Attorney, Agent, or Firm* — Patwrite Law; Mark David Torche

(57) ABSTRACT

A system and method for real time marking of potential moments of interest in media produced by a media source. The system includes: a logging module configured to register moments and their attributes in real time; a marking trigger configured to indicate potential moments of interest; and a processing module configured to convert the registered moments and their attributes into desired features or elements and to match and align a series of moments with their corresponding media files or clips. The logging module includes either (a) an audio recorder to record audio or (b) a logging module controller to control the start and stop of the media source as a logging session commences or ends.

7 Claims, 3 Drawing Sheets

METHOD OF REAL TIME MARKING OF A MEDIA RECORDING AND SYSTEM THEREFOR

FIELD OF THE INVENTION

The present invention is in the field of video/audio production, in particular for real time capturing of media.

BACKGROUND

The common practice in video production is to supply a video editor with all the raw captured video material in bulk. The video editor then browses through all the material in order to identify moments of interest.

FIG. 1 illustrates an exemplary prior art video editor designed to remove irrelevant sections and add markers 11 of important moments and add cut points 12 for camera switching. The selected moments are then extracted and concatenated into a single sequence that is edited into a final composition.

There are a number of systems and methods of real time marking of potential moments of interest in media. The primary challenge is synchronizing ("syncing") the media source with moments of interest as the media source's time clock is not accessible or is not set correctly. For example, a video recorder's time clock might be reset to the date of manufacturing each time the battery is removed.

Presently, the media source's time clock is required for calculating the offset from the marking system's time. This offset is then used to align marked moments of interest to the media.

There are currently two approaches to address the syncing issue. Both approaches rely on the media source's time:

The first approach involves interfacing with the media source and reading the time of the media source (or reading the timestamps of the media's data packets). This means that either the marking module is embedded in the media source or the marking module has an interface with the media source, which requires compatibility with limited types or brands of media sources. This solution imposes significant constraints on the setup and equipment that can be used.

The second approach involves defining an "anchor" timestamp that allows calculating the time offset between the media and the series of timestamps indicating potential moments of interest. Examples of such anchoring include (a) defining a specific moment in the media, such as a loud sound that can later be identified; and (b) where the video camera operator simultaneously starts a recording and presses a button on the marking system on the marking system to mark a reference moment.

A common practice in video production for aligning multiple cameras on the same timeline (e.g. in an editing program) is to apply pattern recognition on the videos' corresponding soundtracks. The same principle applies to adding an audio track to the timeline.

It is believed that the following publications represent the relevant technology in the field: CN 101296322A (Newauto Technology Co Ltd, 2008 Oct. 29); EP 3306495A1 (Joaquin, et al., 2018 Apr. 11); WO 2019/070608 (Osler, et al., 2019 Apr. 11); CN 101246729A (Hongyuan Zhu, 2008 Aug. 20); CN 111209435A (Shanghai Moxiang Network Tech Co Ltd, 2020 May 29); CN 111259198A (Shanghai Moxiang Network Tech Co Ltd, 2020 Jun. 9); US 2004/212637A1 (Varghese, 2004 Oct. 28); and US 2015/269968A1 (Matejka, et al., 2017 May 9)

The teachings of the aforementioned publications are incorporated by reference as if fully set forth herein.

SUMMARY OF THE INVENTION

The present invention provides a system for and method of real time marking of potential moments of interest in media (e.g. video or audio) by a system that does not rely on obtaining (is independent of) the media source's time directly from the source or from timestamps embedded in the media's metadata or in data packets.

The present invention introduces two approaches to aligning the media and potential moments of interest. The first approach is to record audio as a reference for potential moments of interest. The second approach is to measure the interval between the beginning of the recording or playback and the potential moments of interest.

Embodiments of one aspect of the present invention provide a system for real time marking of potential moments of interest in media by recording an audio track and marking moments and attributes of potential moments of interest.

The system includes: a logging module configured to register moments and their attributes in real time; a marking trigger configured to indicate potential moments of interest; and a processing module configured to convert the registered moments and their attributes into desired features or elements and to match and align a series of moments with their corresponding media files or clips. The logging module either (a) comprises an audio recorder to record audio or (b) comprises a logging module controller to control the start and stop of the media source when a logging session commences or ends.

The system may include a direct or remote electronic or mechanical actuator configured to start and stop the media source and to set the media's start time when the logging session commences or ends.

The marking trigger may be is a user button. The marking trigger may be is a signal.

The processing module may be configured to align a series of registered moments of the media by applying pattern recognition on a recorded audio track and the media's soundtrack.

The processing module may be configured to align a series of registered moments with the media by aligning a media's beginning with the beginning of the logging session.

The processing module may be to match a series of registered moments with corresponding media clips or files by comparing and matching the length of the media clips or files and the lengths of the series of registered moments.

The system may include a communication unit configured to communicate between multiple logging modules and external systems or modules.

Embodiments of another aspect of the present invention provide a method of real time marking of potential moments of interest in media relative to the beginning of a media file.

The method includes (a) registering potential moments of interest in the media in real time; (b) assigning attributes to the potential moments of interest; c) converting the registered moments and their attributes into desired features or elements; and (d) matching and aligning the registered moments and their attributes with corresponding media files or clips of the media. Step (d) is performed by (i) recording audio during a logging session; or (ii) controlling the start and stop of the media source when the logging session commences or ends.

Moments are marked and registered in real time, i.e. as they are identified or shortly thereafter, along with corresponding attributes. The registered moments are marked using timestamps or time intervals or frame counts. These timestamps are converted into features such as markers 11; cut points 12; tags; flags; labels; bookmarks; and effects in the media sequence or as markers in video editing software.

The term "timestamp" refers to a date and time received from or indicated by a system.

The term "system time" refers to a notion of the passage of time in a system (e.g. a computer or camera). The time also includes the passing of days on the calendar. The time is counted from an arbitrary starting date.

The term "media" refers to video or audio or other types of time dependent data streams such as continuous measurements.

The term "moments of interest" means a significant moment or a moment that should be referenced or a moment that needs attention.

The term "attributes" refers to properties or additional information associated with moments of interest. Some examples include classification (e.g. via a color of a visual tag); type (e.g. important moments, moments to delete, or moments designated for a highlight video); user rating; geo-location; image/photo; time and date; description; and an audio message.

The term "marker" indicates a feature or element applied to a certain moment in a video or audio editing platform. Such features may be a visual tag (also called a "marker" in the video production industry), a cut (a trim of a video file/sequence), an effect to be applied etc. Markers may have different colors, attributes, comments etc.

The term "mark", "marking" and their derivatives means an indication or instruction to register a potential moment of interest with its attributes. The moment may be marked manually by a single user; by a crowd of users (a cluster of marks indicated by multiple users is likely to indicate a potential moment of interest); or by using an autonomous module for identifying potential moments of interest.

The term "registered moment" refers to a time reading of the media generated and stored (e.g. by a logging module, defined below). The time reading may be the timestamp from the logging module; a real time clock reading; or the time interval from a known reference moment, such as the beginning of the activity of marking, aka logging session.

A "user" is a person who identifies and marks the potential moments of interest as they occur. The person may be a video operator; a producer at an event; a participant in an event; a spectator; a person watching a video on television, etc.

The term "trigger" means an indication that a moment is to be registered (possibly with its attributes). A trigger may be a mechanical trigger (such as a button) or an electrical trigger, including for example a command from an internal computer program or an external source through wired connection or wireless communication technology, such as "Bluetooth®". Some examples of a trigger include indications from (a) a user; (b) a system that senses the presence of an object in the frame (or in a defined section of the frame); and (c) a computer, program or system that sends one or more triggers according to predefined rules, pattern recognition, etc.

The term "logging module" refers to a stand-alone electronic system configured to register moments of interest and their attributes. The logging module may be a device or a computer program, such as a cell phone application.

The term "stand alone" means that the logging module is independent of the media source's system time and of the media itself, i.e. there is no need to read or receive the media file or stream, or its system time. The logging module functions separately and independently, which is in contrast to present marking systems that rely on a media's system time, typically its time clock. A stand-alone system may be used with any media source. For example, the stand-alone logging module may be a smartphone application while the media source is a videotape recorder.

The term "application" or "app" means a program, such as a smartphone app, that offers the same functionality as the logging module.

The term "conversion", "converting" and their derivatives means the process of converting registered moments (or clusters of registered moments) and their attributes into markers.

The term "match", "matching" and their derivatives mean the process of classification and matching of markers series to their corresponding media tracks. The matching is accomplished by aligning media files' soundtracks to an audio track recorded by the logging module or by matching the media tracks' intervals to the logging sessions' intervals.

The term "alignment", "aligning" and their derivatives means the process of aligning markers with the corresponding media. The alignment is achieved by matching the pattern of the media's soundtrack with the pattern of the audio track recorded by the logging module; or by aligning the beginning of the logging session with the beginning of the media track. As a result, the marked moments are aligned to the corresponding media track.

The term "processing" means the process of converting, matching and aligning, or any combination thereof. The processing may be performed by a stand-alone module; a cloud service; a module embedded in the logging system; or by interfacing with a third-party platform (e.g. through an API, add-on or by generating an importable file).

The term "sequence" means an assembly of audio and video clips. Multiple video clips and audio tracks may be arranged into one workspace.

BRIEF DESCRIPTION OF THE DRAWINGS

The invention may be more clearly understood upon reading of the following detailed description of non-limiting exemplary embodiments thereof, with reference to the following drawings, in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Illustrative embodiments of the invention are described below. In the interest of clarity, not all features/components of an actual implementation are necessarily described.

Figure 1:
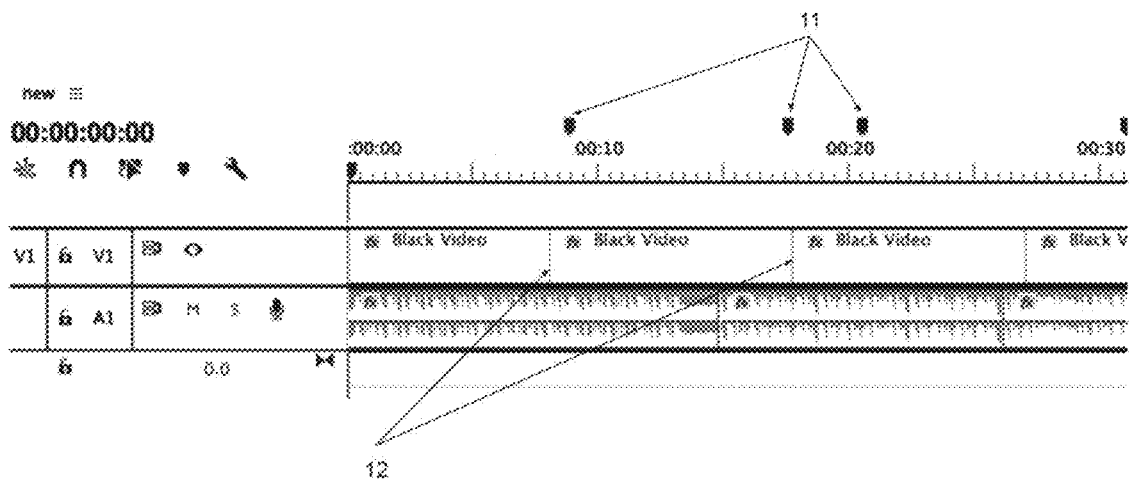
FIG. 1 is a representation of a typical PRIOR ART video editing sequence (used in the "Adobe Premiere Pro®" editing program).
Figure 2A:
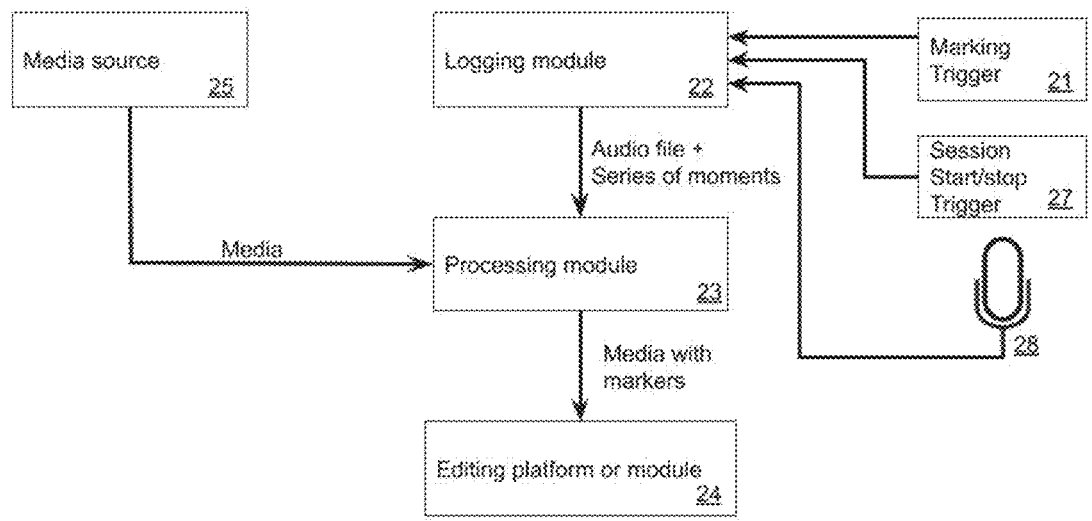
FIG. 2A is a schematic illustration of a system for real-time marking of potential moments of interest in media, using an audio recorder, in accordance with embodiments of the present invention.
Figure 2B:
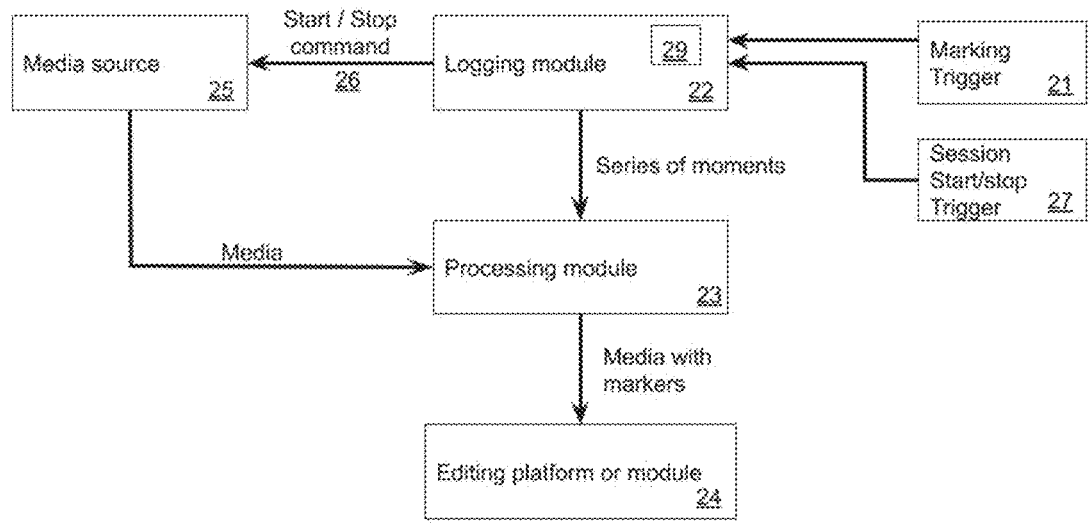
FIG. 2B is a schematic illustration of a system for real-time marking of potential moments of interest in media, in accordance with embodiments of the present invention with control of the start/stop action of the media source.

FIG. 2A and FIG. 2B depict a system for real-time marking of potential moments of interest in media, including a stand-alone logging module 22 for real time capturing of potential moments of interest and their attributes. The system includes a logging module 22; a marking trigger 21; (e.g. a button or other actuator) and a session start/stop trigger 27. When the logging module 22 is triggered by a marking trigger 21, a moment is registered along with its attributes. The registered moment may be saved locally or remotely.

The system also includes an audio recorder 28, such as a recording program or unit. During a marking session, audio is recorded by the logging module 22. When the logging module 22 is triggered by a session start/stop trigger 27 a logging session is started by recording an audio track by audio recording program/unit 28. When triggered again, the session ends and the audio recording is stopped (illustrated by a controllable microphone 36).

As noted in the background, above, it is a common practice in video production to synchronize video and audio tracks from multiple sources by applying pattern recognition on their corresponding soundtracks for matching and aligning the tracks. The present system uses the same principle, and may use the same tools for aligning the audio track and the registered moments. Aligning the audio track with the media automatically aligns the registered moments as well. The audio may also carry additional information such as voice notes. Once aligning is achieved the audio track may be discarded.

The system also includes a processing module 23 configured to convert, match and align (FIG. 3A, step 32), or any combination of them, the media and the series of registered moments. The registered moments and their attributes are converted into markers 11. The series of markers are then matched and aligned to their corresponding media clips or files. The processing may be performed by a stand-alone module; a cloud service; a module embedded in the logging system; or by interfacing with a third-party platform (e.g. through an API, add-on or by generating an importable file).

The system may also include an editing platform or module 24 (e.g. a video editing program or a broadcast station etc.) to perform common editing processes such as deleting recorded segments and re-arranging recorded segments.

The system's logging module 22 may also include a start-stop logging module controller 29 embedded therein, configured to send a start and stop command 26 to the media source (i.e. recording or playback), when triggered by a session start/stop trigger 27, and configured to simultaneously start a logging session. The start-stop controller may be a physical actuator (e.g. an actuator that presses the record/stop button of a camera); an electronic interface; or a wireless remote controller.

Figure 3A:
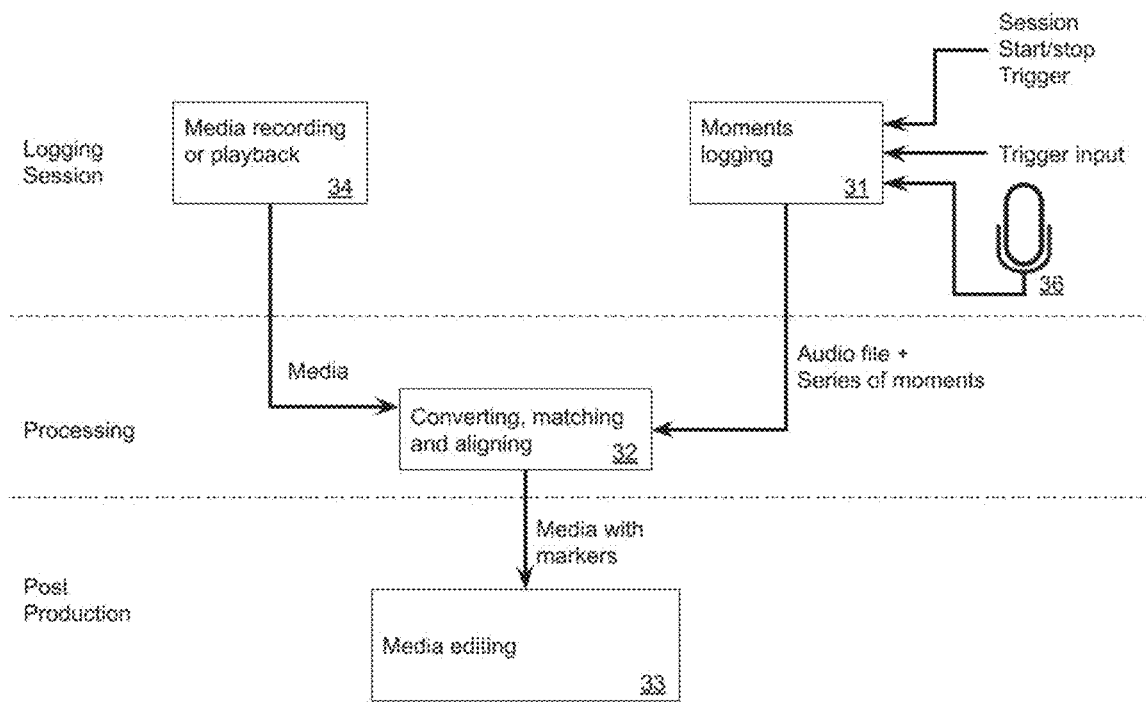
FIG. 3A is a block diagram depicting a method of real-time marking of potential moments of interest in media, using an audio recorder, in accordance with embodiments of the present invention.
Figure 3B:
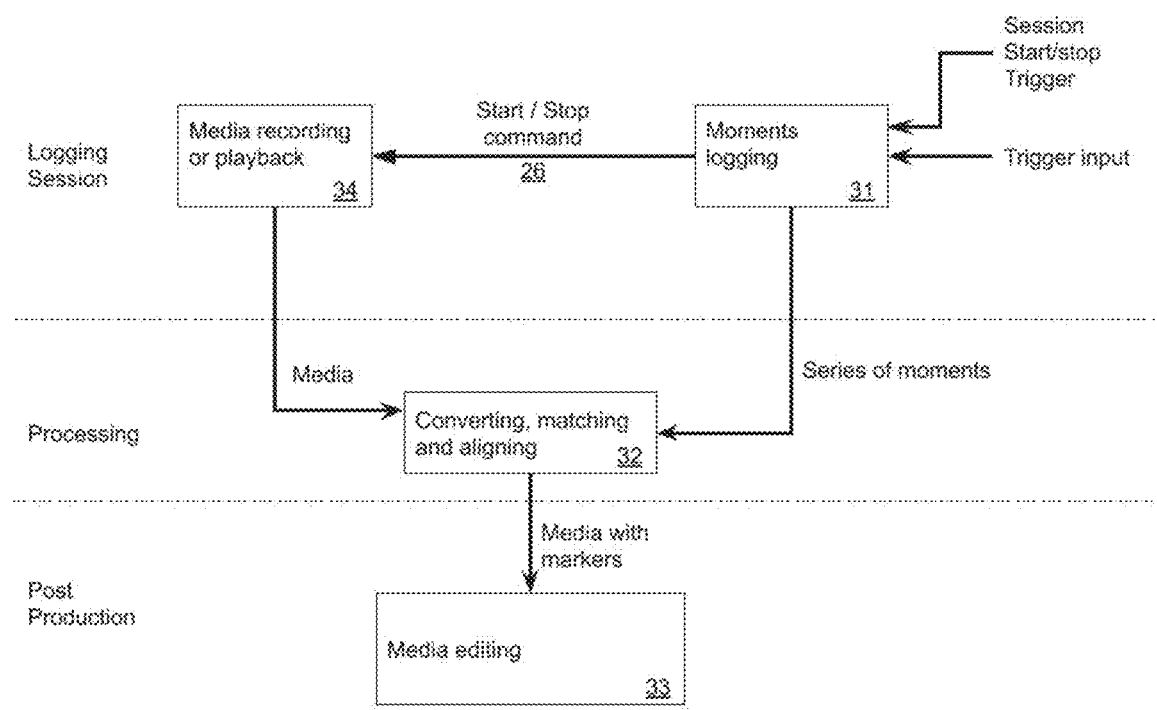
FIG. 3B is a block diagram depicting a method of real-time marking of potential moments of interest in media, in accordance with embodiments of the present invention with control of the start/stop action of the media source.

FIG. 3A and FIG. 3B illustrate a method of real time marking of media in accordance with embodiments of the present invention. During a logging session (of an event, show, lecture, radio broadcast, or the like) potential moments of interest are logged, i.e. logged in real time 31. The registered moments may have additional attributes such as type, rating, geo-location, time and date, description, voice notes, and so on.

In one embodiment of the invention audio is being recorded by the logging module 22. When triggered, by the marking trigger a potential moment of interest is registered.

The logging module 22 may control (step 26) the media's action (step 34), namely, the start and stop of the media's recording or playback. When a session start/stop trigger is received, a start/stop command is sent to the media source, a logging session begins, and a start moment [$T_s$] is registered. $T_s$ may be a timestamp of the logging module's system time of a real time clock (RTC) or be set as $T_s=0$ (for registering elapsed time from the beginning of the recording). Potential moments of interest ($T_1, T_2 \ldots T_n$) and an end moment (end time $T_e$) are registered in the same manner.

As the start moment $T_s$ represent the beginning of the media clip, the interval of each registered moment from $T_s$ correctly marks the intended moment in the media clip (thus the media source's time is irrelevant). In the case of multiple video clips or sources, the clips may be matched to the corresponding series of moments of interest by comparing the length of each video ($L_v$) to the time interval of each series of moments of interest ($L_L$). $L_L$ is the time interval between $T_e$ and $T_s$ ($L_L$ equals $T_e-T_s$ equals $L_v$).

The registered moments are first converted (step 32) into appropriate markers, features or elements in a video editing platform such as visual tags (markers 11); cut points 12; effects, etc. The series of registered moments are then matched and aligned (still step 32) with the media files or clips for the purpose of editing (step 33).

Figure 4:
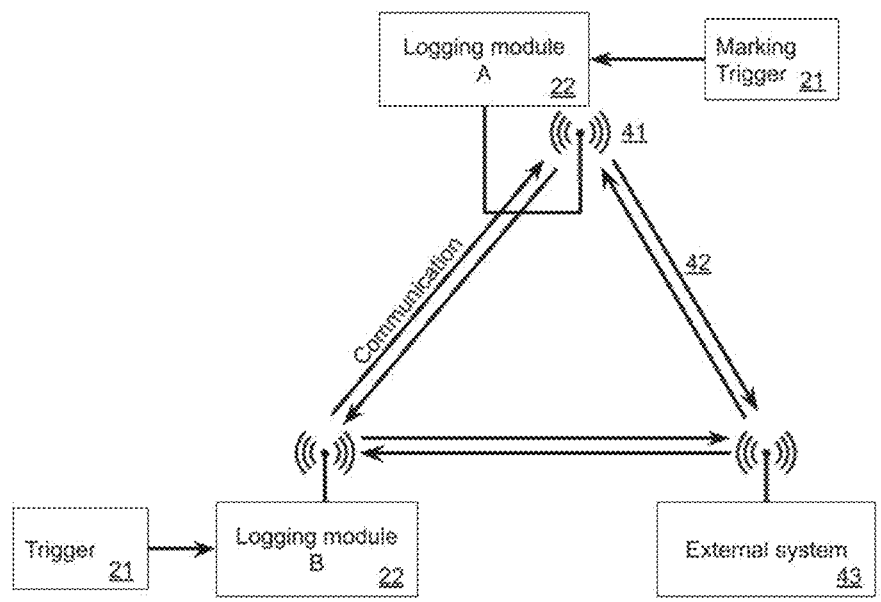
FIG. 4 is a schematic illustration of wireless communication between multiple logging modules and other external systems.

A communication unit 41 may be included for communicating 42 between multiple logging modules 22 and with external systems 43 (e.g. communicating with cameras or monitors, communication with a cloud service, etc.), depicted in FIG. 4. Communication between multiple logging modules 22 allows sending messages and notifications from one logging module to another. For example, in a multi-camera video production, camera switching may be indicated in real time. In this scenario, a producer chooses which camera to use in each moment. The producer's choice is indicated by the other devices.

One implementation of the present invention may be for professional video production using the audio recording. Throughout a logging session, media is recorded or played (step 34) by one or multiple media sources 25. At the same time, a separate audio track is recorded by logging module 22. The device operator presses marking trigger 21 to indicate a potential moment of interest or a different button/actuator to indicate a suggested camera switching time. After the marking session is complete, the video editor receives the media files plus the data from logging module 22. The video editor may use a converting program to "import" and align the tracks and markers into the editing platform. Additional buttons/actuators may be included in the system to indicate different types of features, such as markers 11 with different colors, cut points 12, camera switching, effects, etc.

Another implementation of the present invention may be for professional video production using the beginning of the media recording. Here, logging module 22 includes an embedded video recorder remote control within media source 25. When the video operator presses start/stop trigger 27 on logging module 22, a signal is sent to the video recorder of media source 25 and a recording begins ($T_s$ is registered). The video operator presses a marking button(s) to mark potential moments of interest. When the start/stop button is pressed again, the media file and series of registered moments are processed and imported into a video editing platform, aligned on a sequence. After the logging session is complete, the video editor receives the media files and the series of registered moments. The video editor imports the files into a processing module (e.g. a plug-in program in the editing program) and the media appears on the video editing program with aligned markers 11, cut points 12, effects etc. Additional buttons/actuators may be included in the system to indicate different types of features.

Another implementation of the present invention may be used for applying marks by a so-called "wisdom of the crowd" technique. A crowd of spectators at a sporting event may mark and rate moments in the event as they occur by using multiple logging modules 22, which can be handheld devices or smartphone apps (e.g. by pressing on a button or screen icon). The marks are collected and analyzed by a local or remote collection system. The "wisdom of the crowd" is used to determine the intensity or the significance of each moment in order to generate a highlights video of the event.

The present system and method may also be used for real time marking of potential moments of interest (or moments to ignore) while recording or capturing other types of data such as continuous measurements (e.g. temperature, sound, meteorological measurements, seismic vibrations etc.).

It should be understood that the above description is merely exemplary and various embodiments of the present invention may be devised, mutatis mutandis, and that the features described in the above-described embodiments, and those not described herein, may be used separately or in any suitable combination; and the invention can be devised in accordance with embodiments not necessarily described above.

The invention claimed is:

1. A system for real time marking of potential moments of interest in media produced by a media source, the system comprising:
    a logging module configured to register moments and their attributes in real time;
    a marking trigger configured to indicate potential moments of interest; and
    a processing module configured to convert the registered moments and their attributes into desired features or elements and to match and align a series of moments with their corresponding media files or clips,
    wherein the logging module either (a) comprises an audio recorder to record audio or (b) comprises a logging module controller to control the start and stop of the media source when a logging session commences or ends; and
    wherein the processing module is configured to align a series of registered moments of the media by applying pattern recognition on a recorded audio track and the media's soundtrack.

2. The system of claim 1, comprising a direct or remote electronic or mechanical actuator configured to start and stop the media source and to set the media's start time when the logging session commences or ends.

3. The system of claim 1, wherein the marking trigger is a user button.

4. The system of claim 1, wherein the marking trigger is a signal.

5. The system of claim 1, comprising a communication unit configured to communicate between multiple logging modules and external systems or modules.

6. A system for real time marking of potential moments of interest in media produced by a media source, the system comprising:
    a logging module configured to register moments and their attributes in real time;
    a marking trigger configured to indicate potential moments of interest; and
    a processing module configured to convert the registered moments and their attributes into desired features or elements and to match and align a series of moments with their corresponding media files or clips,
    wherein the logging module either (a) comprises an audio recorder to record audio; or (b) comprises a logging module controller to control the start and stop of the media source when a logging session commences or ends; and
    wherein the processing module is configured to align a series of registered moments with the media by aligning a media's beginning with the beginning of the logging session.

7. A system for real time marking of potential moments of interest in media produced by a media source, the system comprising:
    a logging module configured to register moments and their attributes in real time;
    a marking trigger configured to indicate potential moments of interest; and
    a processing module configured to convert the registered moments and their attributes into desired features or elements and to match and align a series of moments with their corresponding media files or clips,
    wherein the logging module either (a) comprises an audio recorder to record audio; or (b) comprises a logging module controller to control the start and stop of the media source when a logging session commences or ends; and
    wherein the processing module is configured to match a series of registered moments with corresponding media clips or files by comparing and matching the length of the media clips or files and the lengths of the series of registered moments.

* * * * *